(12) United States Patent
Miller (10) Patent No.: US 7,174,933 B1
(45) Date of Patent: Feb. 13, 2007

(54) EASY MOUNT TIRE CHAINS

(76) Inventor: Ray R. Miller, 2318 50th St. Ct. NW., Gig Harbor, WA (US) 98335

( * ) Notice: Subject to any disclaimer, the term of this patent is extended or adjusted under 35 U.S.C. 154(b) by 27 days.

(21) Appl. No.: 11/116,898

(22) Filed: Apr. 28, 2005

Related U.S. Application Data (63) Continuation-in-part of application No. 11/030,682, filed on Jan. 5, 2005.

(51) Int. Cl.
B60C 27/00 (2006.01)

(52) U.S. Cl. .................. 152/171; 152/175; 152/231

(58) Field of Classification Search ............... 152/171, 152/175, 217, 218, 219, 221, 223, 231, 239
See application file for complete search history.

(56) References Cited

U.S. PATENT DOCUMENTS

| | | | | |
|---|---|---|---|---|
| 1,486,993 A | * | 3/1924 | Stolpe .................. | 152/242 |
| 3,842,881 A | * | 10/1974 | Muller et al. ........... | 152/213 A |
| 4,066,112 A | * | 1/1978 | Goldstein ............... | 152/213 A |
| 4,111,251 A | * | 9/1978 | Bula .......................... | 152/219 |
| 4,215,733 A | * | 8/1980 | Rieger et al. ............... | 152/171 |
| 4,679,608 A | * | 7/1987 | Jeindl ..................... | 152/213 A |
| 5,056,574 A | | 10/1991 | Maresh et al. | |
| 5,804,001 A | * | 9/1998 | Christian .................... | 152/241 |
| 6,026,876 A | * | 2/2000 | Snyder ....................... | 152/218 |
| 6,651,713 B2 | * | 11/2003 | Bergeron .................... | 152/219 |
| 2004/0226640 A1 | * | 11/2004 | Woodworth et al. ........ | 152/217 |

FOREIGN PATENT DOCUMENTS

| FR | 2630682 | * | 4/1989 |
|---|---|---|---|
| FR | 2630682 | * | 11/1989 |

* cited by examiner

Primary Examiner—Russell D. Stormer (57) ABSTRACT

Configurations and installation methods for vehicle tire chains which provide tire chains especially easy to mount, and provide improvements in performance and vendor supply.

2 Claims, 7 Drawing Sheets

EASY MOUNT TIRE CHAINS

CROSS REFERENCE TO RELATED APPLICATIONS

This is a continuation (CIP) of application Ser. No. 11/030,682, filed Jan. 5, 2005.

FEDERALLY SPONSORED RESEARCH

Not applicable.

SEQUENCE LISTING OR PROGRAM

Not applicable.

BACKGROUND OF THE INVENTION

1. Field of the Invention

This invention relates to vehicle tire chains, specifically configurations and mounting methods that allow chains, as described, to be mounted onto a wheel more easily than previously possible.

2. Prior Art

Tire chains are available in many configurations, including the following: Chains are available made of steel link chain or made of multi-strand steel cable. The most common configuration of link type chains is the so called ladder type, consisting of two side members and a multiplicity of cross members arrayed on the tire tread and attached to the two side members. Other, more complex configurations made of link chain include a so called diamond pattern. Cable chain configurations include the ladder type and a so called diagonal or zig zag type pattern.

The diamond pattern is disclosed in U.S. Pat. No. 3,842,881, Oct. 22, 1974, Muller et al, and the zig zag pattern in U.S. Pat. No. 5,056,574 Oct. 15, 1991, Maresh, et al, and several earlier patents, including U.S. Pat. No. 1,486,993, Mar. 18, 1924, Stolpe. Both of these patterns utilize a distinctive mode of installation on the wheel, involving arraying the chain on the ground in front of the wheel, sweeping it to the rear of the wheel and drawing chain elements forward for fastening, including drawing lower chain portions around the tire to ground contact area. While this mode is claimed to be "easy mounting", the step of sweeping the chain to the rear of the wheel can be quite inconvenient in soft snow or mud.

The ladder pattern and other patterns typically use the drive-over method of chain installation.

BRIEF SUMMARY OF THE INVENTION

The present invention discloses improvements in a category of vehicle tire chains which utilizes the mounting step of imposing cross chains on the tire to ground contact area. These improvements include configurations for easier mounting, improved stabilization of the chain against operating forces, and an improved method of vending the chain.

OBJECTS OF THE INVENTION

An object of this invention is to provide a vehicle tire chain which is easier to install on a wheel than the prior art.

A further objective is to provide an easy to mount tire chain, which can be fully mounted during one stop of the vehicle.

A further object is to provide an easy to mount tire chain which can be mounted during one stop of the vehicle and will be self actuating to provide adequate traction elements uniformly over the tire tread, specifically to fill in the tire to ground contact area, not covered upon initial mounting.

A further object is to provide an easy to mount tire chain which can be mounted during one stop of the vehicle and which will be fully serviceable in resisting and tolerating random operating forces significantly greater than normal, such as those from heavy braking, turning and skidding.

It is an additional objective to use the principles of this invention to enable a specific, given chain, to fit a broader range of tire sizes, to improve the marketing economics, as to manufacturing cost, inventory and parts supply.

DETAILED DESCRIPTION OF THE PREFERRED EMBODIMENTS

The present invention can only be adequately understood by noting the operating characteristics of the known art which the present invention is applied to.

Figure 1:
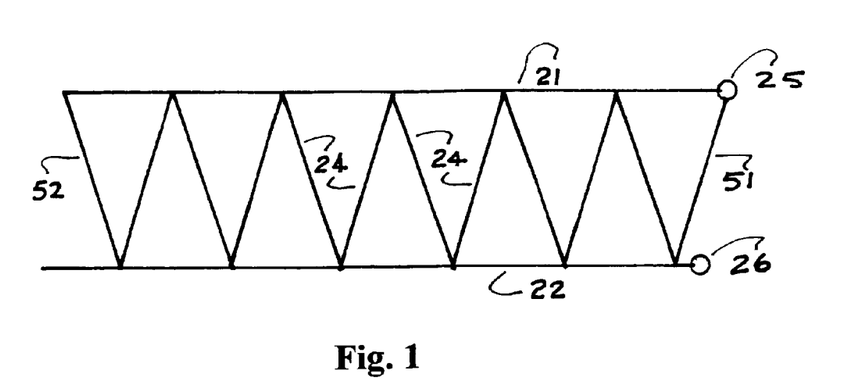
FIG. 1 is a schematic plan view of a zig zag pattern tire chain.
Figure 2:
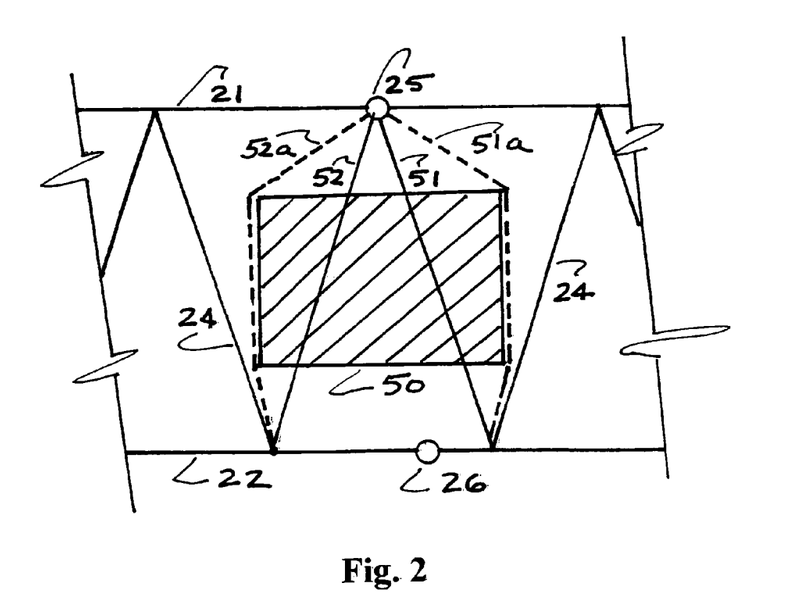
FIG. 2 is a schematic partial plan view of the tire chain of FIG. 1.
Figure 3:
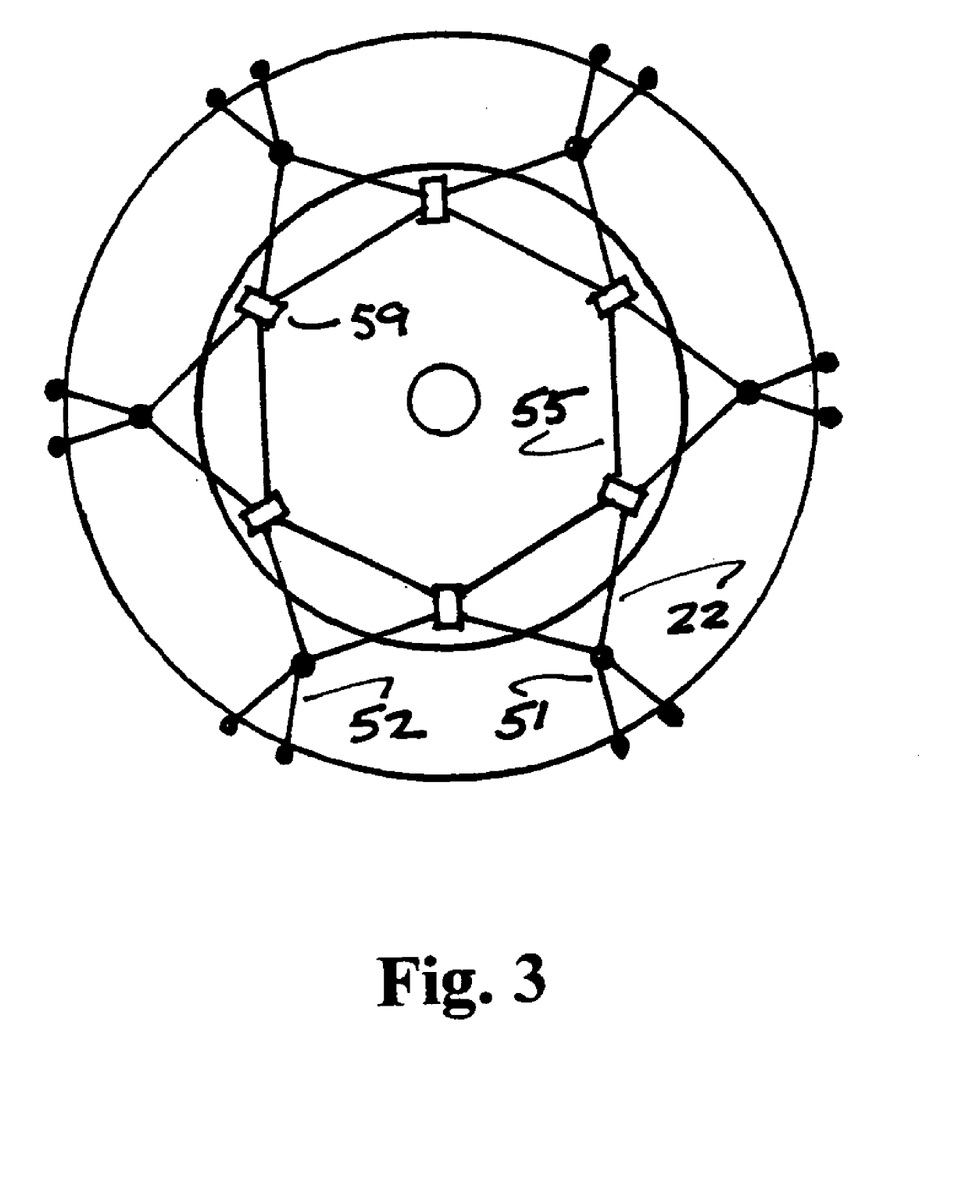
FIG. 3 is a schematic elevation of the chain of FIGS. 1 and 2, using a known art tightener configuration.

A commercially popular model of tire chain is based generally on Maresh, et al, U.S. Pat. No. 5,056,574, and is shown in FIGS. 1, 2, and 3. The Maresh chain utilizes a diagonal pattern, or so called zig zag pattern of cross chains. Six repetitions of the pattern are generally sufficient for a passenger car tire chain. Six repetitions leaves room for significant slack in the side chains, between attachment points of paired cross chains. The chain is stabilized by a loop of elastic band 55, hooked into each side chain segment, using hooks 59 in FIG. 3.

This elastic loop serves to provide both a required tensioning function and a required chain stabilizing function. The tensioning function is required because the mounting procedure involves imposing an adjacent pair of cross chains upon the contact area between the tire and the ground or roadway. This deflects the two cross chains 51 and 52 in FIGS. 1, 2, and 3, causing the cross chain ends to retract from the side chain connections, thus depressing the side chains.

The cross chains must be pulled into their normal operating positions, when the wheel is turned, releasing the tire to ground contact pressure. The tension required to move the chains is quite small, on the order of a pound, but it is an important function.

The inner face side chain is inaccessible, so the tension must be applied to the outer face side chain.

The other function, that of stabilizing the chain against operating forces, is much more demanding, in terms of force levels, as the primary chain elements, cross chains and side chains, must withstand normal operating forces due to driving, turning, braking, and also higher level forces such as severe braking and skidding.

The elastic loop 55 in FIG. 3 performs the tensioning function quite well, but random operating forces can exceed the capability of the elastic loop to withstand. The present invention involves replacing the elastic loop with a combination of elastic connectors and steel, or non elastic connectors, arranged to fulfill the two necessary functions, tensioning and stabilizing.

The stabilizing function can be greatly improved by the use of steel or non elastic connectors, in conjunction with the elastic tightener. There is a myriad of possible patterns for such steel connectors. A minimum configuration would be a single strand of chain, oriented horizontally (during mounting) and hooked to the side chain segments on each side of the lateral attachment points. (61 in FIG. 4).

Figure 4:
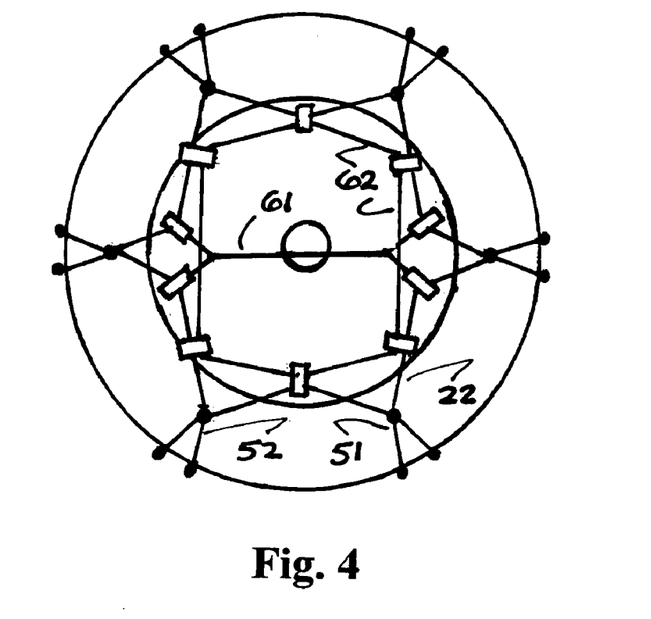
FIG. 4 is a schematic elevation of a zig zag pattern chain using a six hook elastic tightener loop and a non elastic stabilizing connector.

Some stabilization will extend to the other four attachment points, above and below. The six hook elastic band 62, used for tensioning, will add further stabilizing to the upper and lower attachment points.

Figure 5:
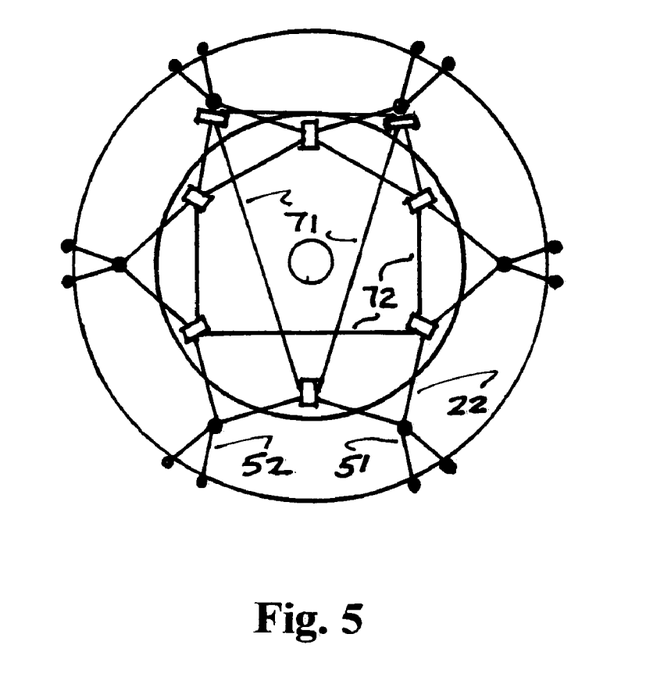
FIG. 5 is a schematic elevation of a zig zag pattern chain using an elastic tightener band on the lower segment of the side chain and a non elastic loop hooked to other segments.

The release of the deflected cross chains upon vehicle movement allows the bottom segments of both the outer face side chain and inner face side chain to rise. The rear face action can be passed up the rear face and over the top resulting in a dropping of the outer face side chain top segment. In FIG. 5, elastic band 71 is hooked to the lower segment of the outer face side chain and to the upper segment connections, and a non elastic connector is hooked to the other segments.

In the chain of FIG. 5, tension is applied to the outer face top and bottom segments, to ensure proper repositioning of the deflected cross chains. An elastic tightener band will suffice.

As a matter of technique, the steel connector, or connectors, would be hooked onto the side chain, before the side chain is hooked to itself to form a loop on the wheel. That attachment will tighten the side chain into the multiplicity of hooks on the steel connector.

After the side chain is connected, the tightener band is applied, which will further integrate the assembly. The tension at each hook need not be excessive, as there is no elasticity in the steel connectors.

A no slack side chain is greatly distinguished from the above described high slack chain, in that the no slack chain is self stabilizing when fully mounted.

The present invention includes a somewhat more advanced solution to the situation described above with the high slack chain. The innovation is to provide a sliding connection of the deflected cross chains, such as 51 and 52 in FIGS. 1, 2, and 3, to the outer face side chain 22. The purpose is to allow the deflected cross chains to retract through the sliding connections, when imposed upon the tire to ground contact area. This allows the outer face side chain to be fully connected (to itself) during the initial mounting procedure, without regard to the position of the deflected cross chains.

Figure 6:
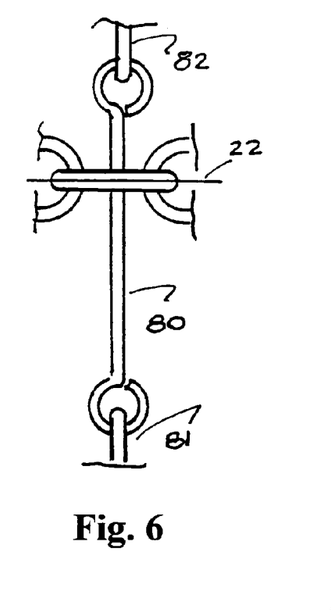
FIG. 6 is a cross member extension device for link chains.
Figure 7:
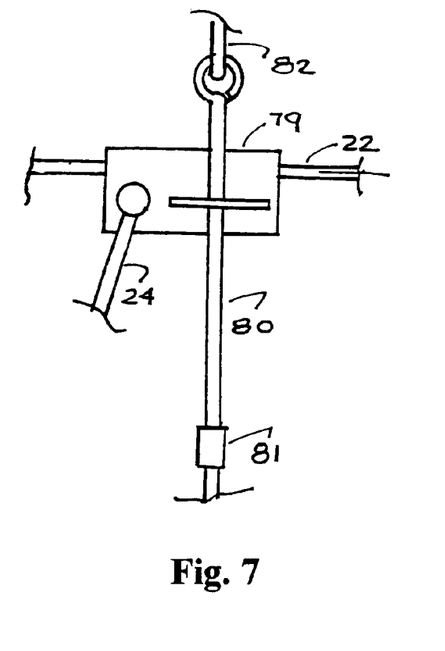
FIG. 7 is a cross member extension device for cable chains.

FIG. 6, for link chain, and 7, for cable chain, show the cross chain extension and sliding connection to the outer face side chain 22. Tension devices 82, typically elastic tightener bands, are attached to the extended ends of the cross chains, to pull the deflected cross chains 81 into position, upon initial operation of the vehicle.

Figure 8:
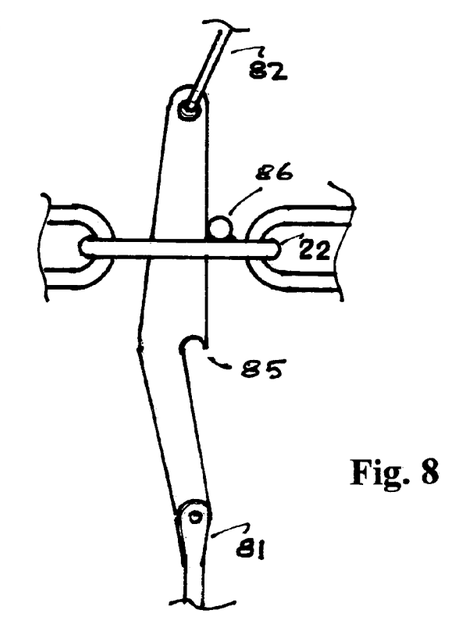
FIG. 8 is a cross member extension device fitted with a non return feature.

To prevent random operating forces from pulling the deflected cross chains back through the sliding connections, a non return device can be built into the sliding connection. There is a myriad of ways such a device could be configured. It can be as simple as a notch 85 on the side of a flat bar, as in FIG. 8, which engages a stop bar 86 on the side chain, to prevent return movement. This device must be rugged and sturdy to withstand unusually high random operating forces, for instance a skid onto bare pavement.

Figure 9:
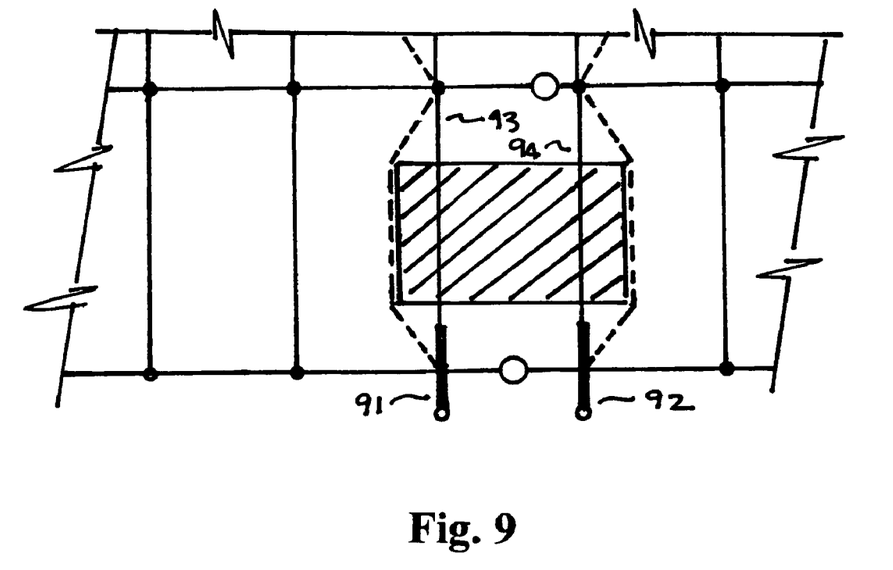
FIG. 9 is a schematic plan of a ladder chain fitted with two cross chain extensions.
Figure 10:
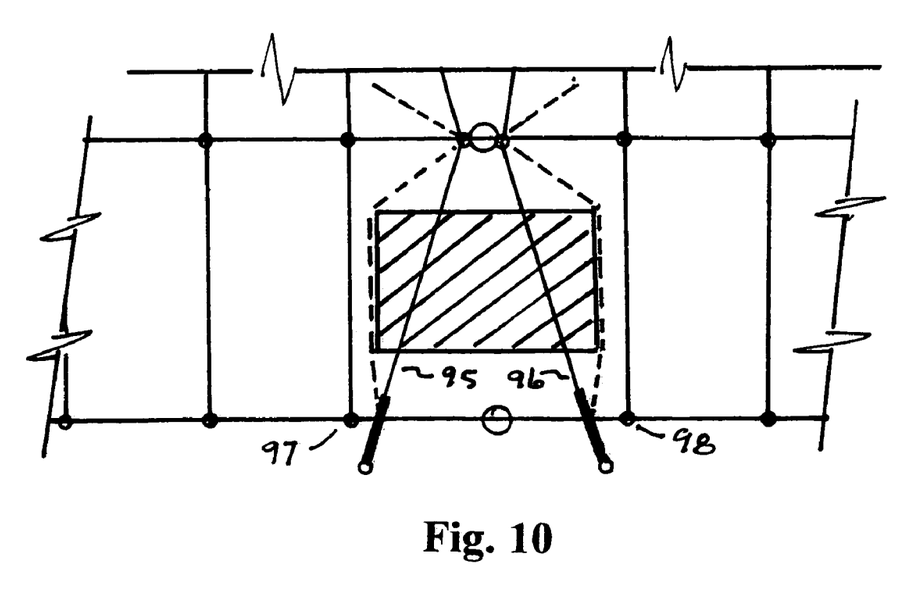
FIG. 10 is a schematic plan of a ladder chain with two deflected cross chains oriented diagonally.

FIG. 9 shows the cross chain extensions 91 and 92 applied to adjacent cross chains 93 and 94 in a ladder pattern tire chain. It is advantageous to orient the cross chains diagonally, as 95 and 96 in FIG. 10, to shorten the distance between fully connected adjacent cross chains 97 and 98, and to improve the support for the sliding connections.

Figure 11:
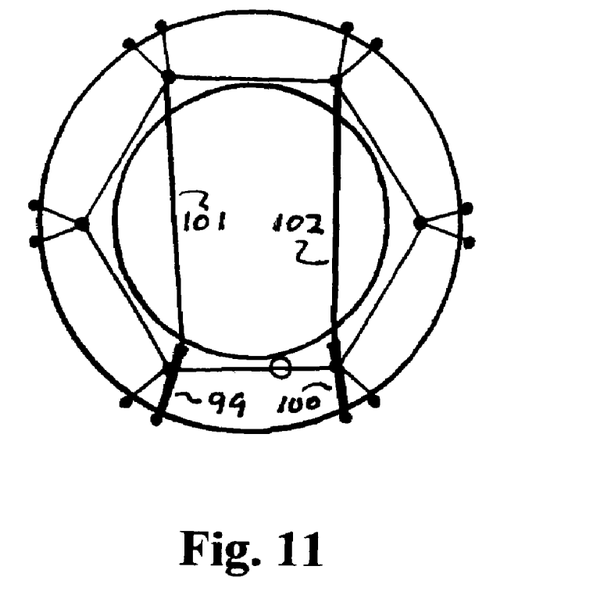
FIG. 11 is a schematic elevation of a chain with two deflected cross members fitted with extension device.
Figure 12:
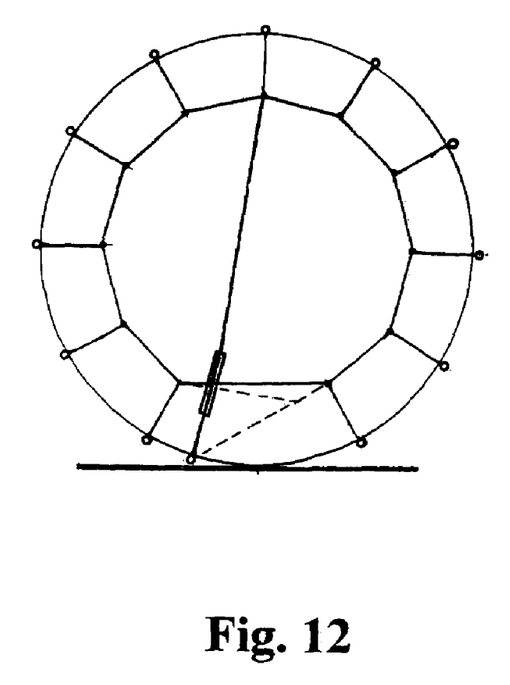
FIG. 12 is a schematic elevation of a chain with one deflected cross member fitted with extension device.
Figure 13:
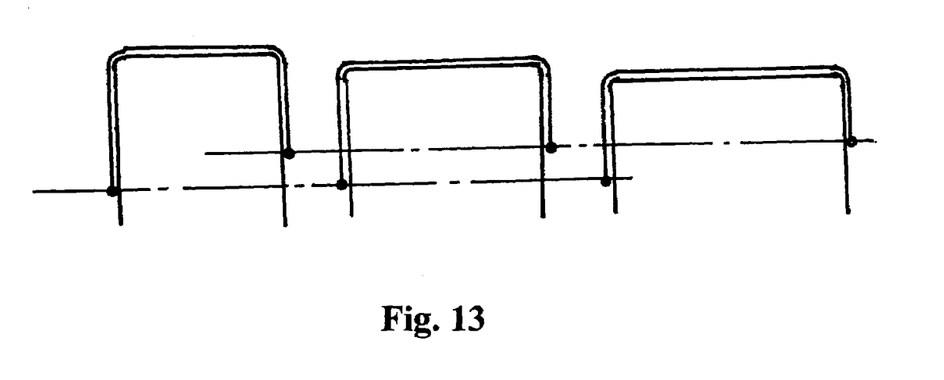
FIG. 13 is a view of equivalent tire sizes for tire chain supply.

FIG. 11 shows two deflected cross chains fitted with extensions 99 and 100 and tensioned by elastic bands 101 and 102. FIG. 12 shows a single cross chain extension.

In the commercial marketing of tire chains, it is highly desirable that a given tire chain fit the largest possible range of tire sizes, in order to minimize the required inventory to stock chains for sale for all tire sizes. The principles of the present invention can be utilized to help meet this objective. The following discussion relates only to tire chains which have relatively long segments of the outer face side chain, such as the zig zag and diamond patterns. Excluded from this discussion would be the ladder and similar patterns. The discussion does relate to both cable and link type construction.

The chain to suit a certain tire size will have the appropriate diameter of both inner and outer face side chains, as well as the appropriate length of cross members. That chain can be used, as is, for all equivalent tire sizes, in which a decrease in tire diameter is matched by an increase in width, or an increase in tire diameter is matched by a decrease in width, as shown in FIG. 11, so the side chains stay at the same diameter. The limit of this variation is the preferred minimum distance from each side member to the outer tire diameter.

That chain, as selected, can not be used for a larger tire size (larger than the equivalent tire sizes) as the side chain diameters are set; that is, increasing the diameter of a side chain or the length of cross chains makes it a different chain, by definition.

The selected chain can readily be used for a smaller tire size by arranging to take care of the slack in the outer face side chain segments, between the cross chain attachment points, created by moving the cross chain attachment points on the outer face to a smaller effective diameter of the side chain, as defined by the cross chain attachment points.

Examples of the elastic tensioning devices and non elastic stabilizing devices which make up the connector sets to put with the basic chain, are shown in FIGS. 4 and 5.

Since it is impractical to change the inner face side chain diameter, it is preferable to start with the minimum practical inner face side chain diameter, leaving the greatest room to reduce tire diameter, without going below the desired minimum clearance of inner face side chain diameter and tire diameter. This discussion assumes that all size variations are taken into account at the outer face side chain.

The novel features of the present invention are entirely usable for tire chains for dual wheels.

All of the chains claimed in this application can be adapted to a mounting method of "sweeping about the bottom of the tire", as described in Maresh, et al, or the "over the top" mounting method described in inventor's earlier application, as both employ the step of imposing cross chains onto the tire to ground contact area, which these disclosures are based on. Only the "over the top" method can be used on dual wheels, whether the chain be single or dual, as the second wheel interferes with the "sweep about the wheel".

It will be evident to those skilled in the art that many variations can be made in the configurations, which are not herein described in detail. Such variations should be considered to be within the scope of the invention if within the encompass of the appended claims.

I claim:

1. A vehicle tire chain, for installation on a vehicle wheel resting on the ground, or roadway, comprising
    a generally circular, flexible side member on the inner face side of the tire,
    a generally circular, flexible side member on the outer face side of the tire,
    an attachment device provided on each side member to attach the ends for each to form a loop on the wheel,
    a multiplicity of flexible cross members between the two side members, arrayed on the tire tread in a repetitive pattern, and
    the pattern is of such density that there is always a cross member in the tire to ground contact area during operation, and
    the installation procedure includes the step of imposing adjacent cross members upon the edges of the tire to ground contact area, such that one or both of said adjacent cross members are deflected from their natural positions in the pattern, and
    said adjacent cross member or members deflected from their natural positions are slidably connected to the outer face side member and are extended through the sliding connection radially inward and beyond the side member a distance adequate to allow for the deflection during installation, and are adapted for tension means to be connected to the radially inward end of the extension.

2. The chain of claim 1 in which extensions of said adjacent cross members radially inward and beyond the outer face side member include a non return means such that when an extended cross member is pulled radially inward through the connection to the side member, to its fully installed position, it is mechanically prevented by said non return means from withdrawing radially outward through said connection.

* * * * *